United States Patent [19]

Vieth

[11] Patent Number: 4,531,421

[45] Date of Patent: Jul. 30, 1985

[54] TRANSFER CASE OIL PUMP

[75] Inventor: Harold F. Vieth, Dubuque, Iowa

[73] Assignee: Deere & Company, Moline, Ill.

[21] Appl. No.: 558,679

[22] Filed: Dec. 6, 1983

[51] Int. Cl.³ .......................... F16H 1/44; F16H 57/04
[52] U.S. Cl. ...................................... 74/467; 184/6.12; 192/113 B
[58] Field of Search ....................... 74/467; 192/113 B; 184/6.12

[56] References Cited

U.S. PATENT DOCUMENTS

| 4,023,661 | 5/1977 | Flotow | 192/113 B |
| 4,235,127 | 11/1980 | Kemper | 74/467 |
| 4,287,783 | 9/1981 | Ida et al. | 74/467 |
| 4,347,756 | 9/1982 | Sogo | 74/467 |
| 4,368,802 | 1/1983 | Grabill et al. | 184/6.12 |
| 4,442,729 | 4/1984 | Hayakawa | 74/467 |
| 4,450,944 | 5/1984 | Fujioka et al. | 192/113 B |

Primary Examiner—Henry G. Yuen

[57] ABSTRACT

A transfer case mounted to a torque transmission member includes a clutch assembly for selectively providing driving communication between the input shaft and output shaft of the transfer case. The clutch assembly includes a vane which propells excess hydraulic fluid within the transfer case to a spout which directs the excess fluid to the transmission member.

5 Claims, 3 Drawing Figures

TRANSFER CASE OIL PUMP

BACKGROUND OF THE INVENTION

This invention relates to a transfer case of the type commonly employed in four wheel drive vehicles.

A transfer case is customarily mounted to the vehicle's transmission or rear transverse axle to allow selective application of driving torque to the front wheels through the front transverse axle fo the vehicle. The mounting location of the transfer case is generally below the horizontal centerline of the vehicle's transmission or transverse axle which provides the opportunity for hydraulic fluid to seep into the transfer case, seepage occuring through the input shaft. Hydraulic fluid may also seep into the transfer case through internal hydraulic clutch. As a result of seepage, an excessive amount of hydraulic fluid can accumulate in the transfer case resulting in a loss of torque and a build up of heat.

It is known to provide sealing means around the transfer case input shaft to reduce seepage, however, such sealing has no affect on seepage through clutches, drive shaft bearings and when used introduces additional cost.

SUMMARY OF THE INVENTION

It is, therefore, an object of the present invention to provide a means of controlling the hydraulic fluid level within a transfer case.

It is a still further objective of the present invention to provide such means within a transfer case by introducing a minimal number of additional components to the transfer case.

A transfer case of generally conventional design utilizing a hydraulic clutch includes a casing fixably mounted to either a vehicle transmission or rear transverse axle and rotatably contains a plurality of gears in constant mesh. An input shaft is received by the transfer case carrying thereon a first gear located within the transfer case. The first gear is in constant mesh with the second gear fixably mounted on a first shaft. A third gear is rotatable mounted on the first shaft and is clutchable to the first shaft utilizing a hydraulic power clutch. The third gear is in constant mesh with a plurality of subsequent gears rotatably mounted on respective shafts to a final gear fixably mounted on an output shaft rotatably mounted in the transfer case and extending therebeyond. The transfer case casing is modified to include a spout or pump outlet feeding back into either a transmission or a rear transverse axle.

The hydraulic power clutch includes a drum having a seated vane. The drum also contains the clutching mechanism. The vane is aligned to the spout such that should the oil or fluid level with the transfer case venture to a level commencerate with the position of the vane, the vane will impel the oil through the spout and back into the transmission or transfer case.

DESCRIPTION OF THE PREFERRED EMBODIMENT

Figure 1:
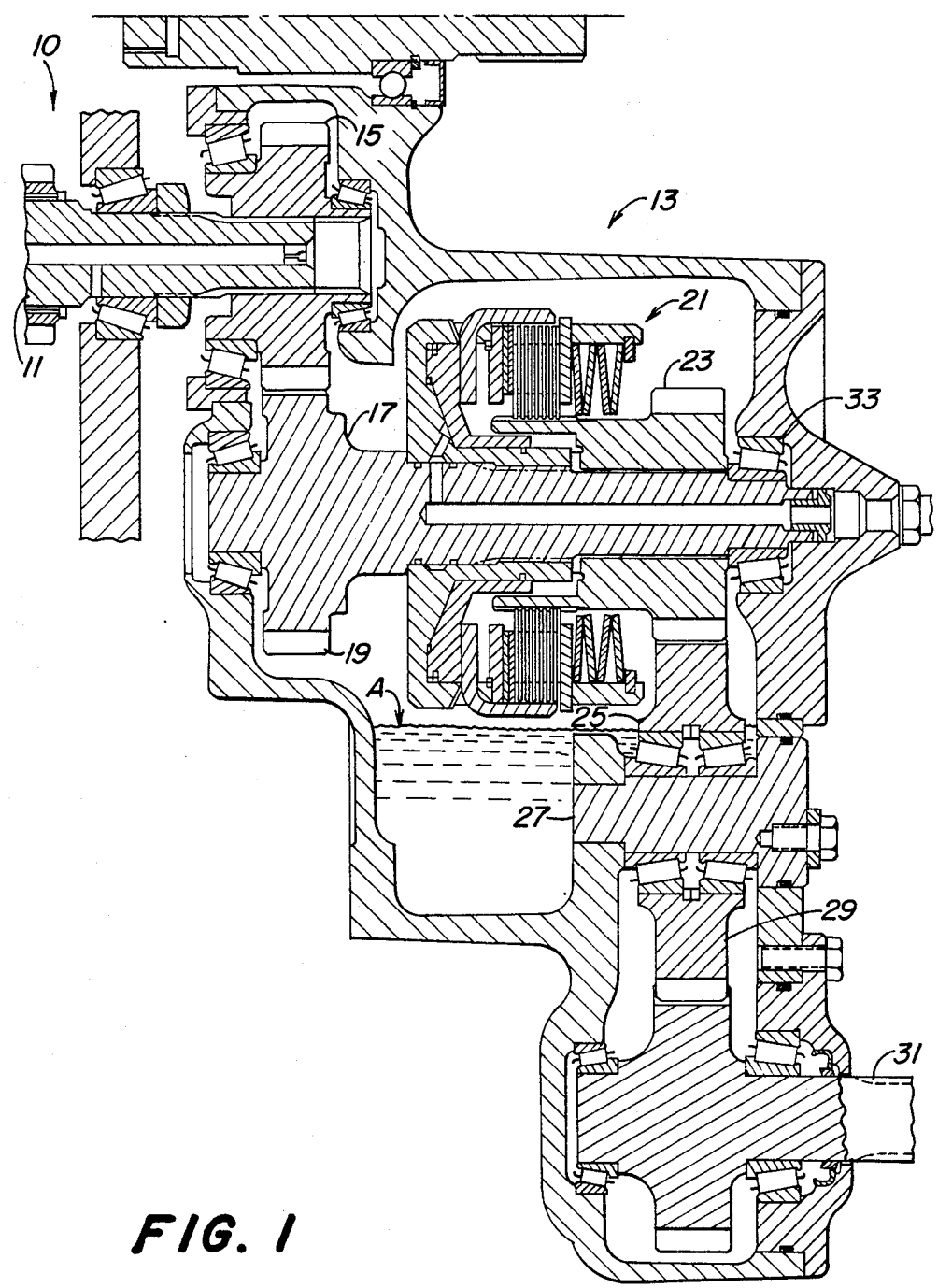
FIG. 1 is an elevated sectional view of a transfer case in accordance with the present invention.

Referring to FIG. 1, a transmission 10 of conventional design (partially shown) of the type utilized in four-wheel drive off-road vehicles, includes an output shaft 11 rotatably received by a transfer case 13 which is fixably mounted to the transmission 10 by any conventional means. The transmission output shaft 11 is partially rotatable supported within the transfer case 13 by any conventional bearing means and has a gear 15 fixably mounted by any conventional means thereon. A first shaft 17 is rotatably mounted in the transfer case by conventional means and contains a fixed gear 19 in constant mesh with the gear 15. Also, carried on the second shaft 17 is a hydraulic clutch assembly, generally indicated as 21, to be further described subsequently. A third gear 23 is rotatably mounted on the shaft 17 and is clutchable to the shaft 17 by clutch assembly 21. The gear 23 is in constant mesh with a gear 25 rotatably mounted by any conventional means on a shaft 27 which in turn is fixably mounted in transfer case 13. The gear 25 is in constant mesh with a gear 29 formed to an output shaft 31 which is rotatably mounted within the transfer case 13 by any conventional means and extending beyond the casing 13 to the forward transverse axle of the vehicle (not shown). The nominal oil level within the transfer case is indicated by an arrow "A".

Figure 2:
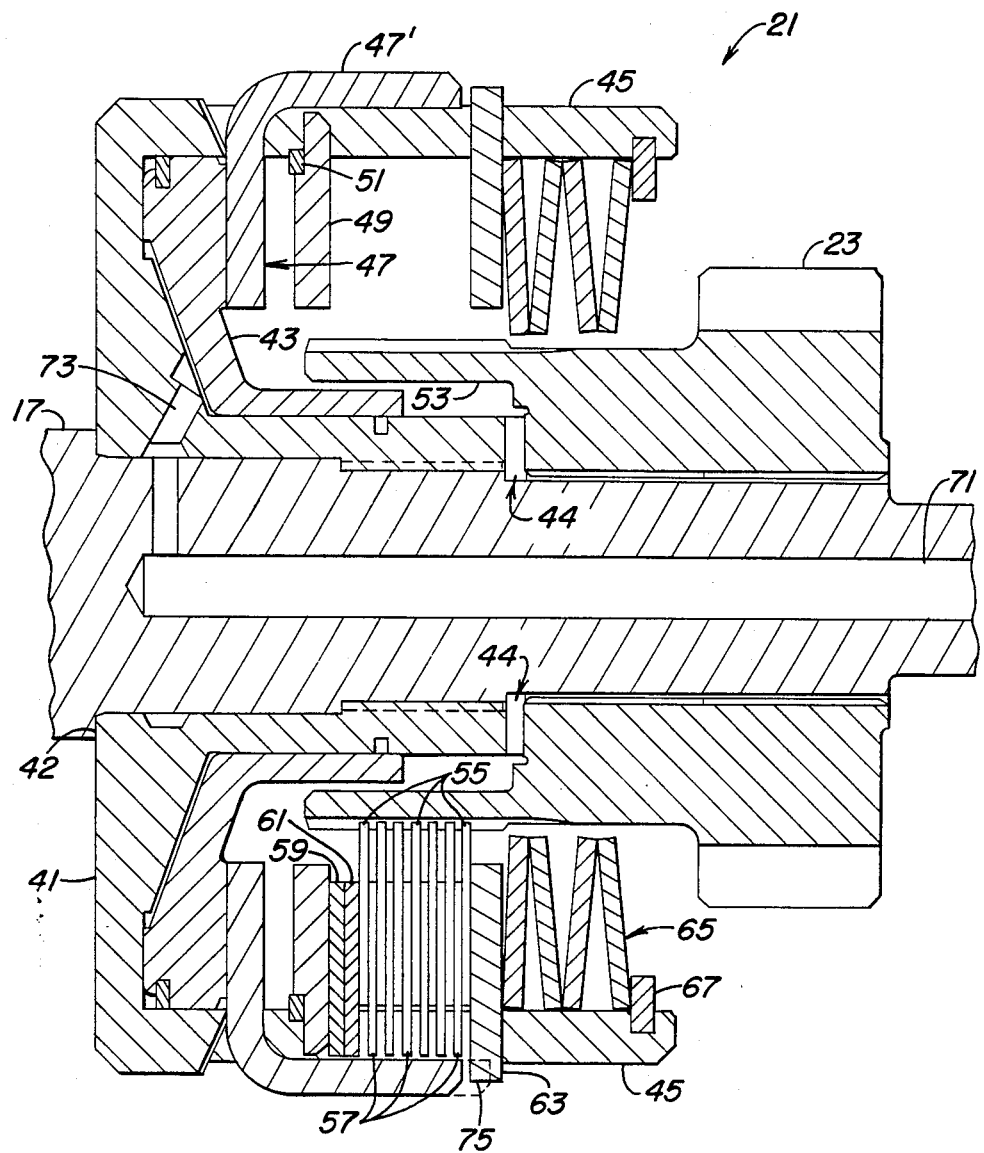
FIG. 2 is an enlarged sectioned view of a clutch and pump within the transfer case.

Referring more particularly FIG. 2. The hydraulic clutch assembly 21 includes drum 41 placed around and splined to the shaft 17. Axial motion of the drum 41 is restained by a vertical shaft landing 42 formed in shaft 17 and a thrust washer 44 placed around shaft 17 capturing drum 41 in between. A piston 43 is seated axially slidable within the drum 41. The drum 41 has a plurality of radially interdispursed fingers 45 which extend coaxially with the shaft 17. Seated within the drum 41 abutting to the piston 43 is a vane 47 which has associated therewith a second plurality of fingers 47' interdispursed and captured between adjacent fingers 45 of the drum 41. The vane 47 is mounted to be axially slidable within the drum 41. The fingers 47' of vane 47 have a radially extention beyond fingers 45 of drum 41.

A clutch plate 49 is mounted within the drum 41 seated within a snap ring 51 and the fingers 45 of the drum 41. The gear 23 has a base portion 53 which extending into the drum 41. A plurality of friction plates 55 are splined to the base 53 of the gear 23. A second plurality of friction plates 55 are splined to fingers 45 of drum 41 such that each plate 57 is between adjacent plate 55. A pressure plate 63 is slidably mounted in drum 41 along fingers 45 for biasing the plates 55 and 57 into contact against the clutch plate 49. A axially extending stack of bevel springs 65 are placed within drum 41 to bias against the outward face of pressure plate 63. A snap ring 67 is fixably mounted a well 69 formed within each finger 45 to retain the springs 65.

The clutch assembly 21 is spring applied and hydraulically released. It is observed that by introducing pressure influenced hydraulic fluid through ports 71 in shaft 17 to port 73 in drum 41, the piston 41 is biased against the vane 47 to slide fingers 47' in a seat 75 formed in pressure plate 63 and thereby release pressure plates 55 and 57 from driving communication.

Figure 3:
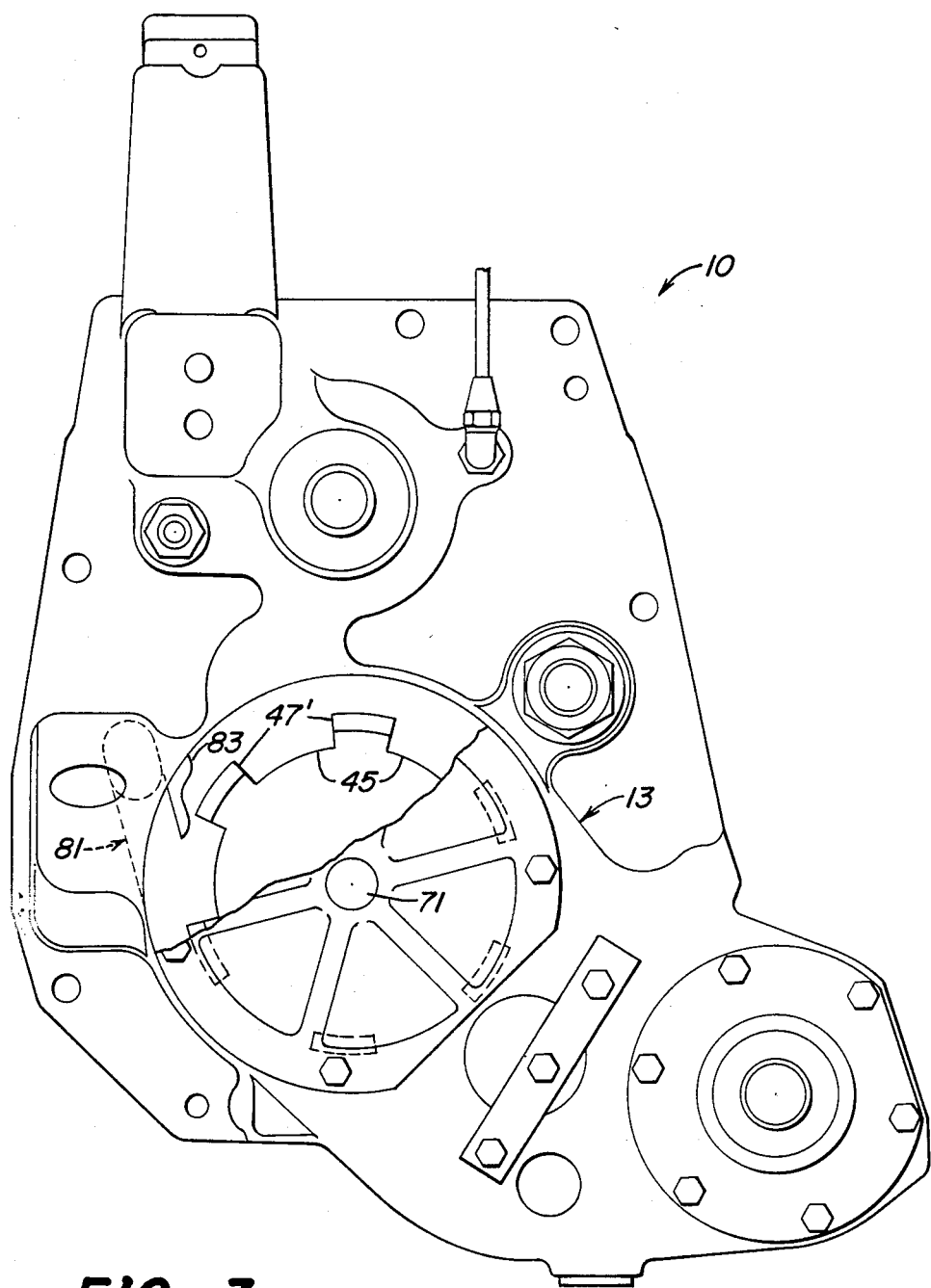
FIG. 3 is an elevated view of the transfer case.

Referring now to FIG. 3, the transfer case 13 includes a spout 81 and a wiper 83 fixably mounted by any conventional means in the transfer case aligned to radially aligned to fingers 47' of vane 47. The spout 81 has an extension from within the transfer case 13 into the transmission 10 at a point above the nominal fluid level of the transmission 10. Upon rotation of the clutch assembly 21, vane fingers 47' will propell a portion of the hydraulic fluid into the spout 81. That is, should the hydraulic fluid within the transfer case exceed a nominal level as determined by the radial extention of vane 47, the excess fluid will be delivered to the transmission 10.

The vane 47 therefor acts as a pump to maintain the proper maximum fluid level within the transfer case while requiring a minimum of additional components.

I claim:

1. An improved transfer case containing hydraulic fluid and having a housing rotatably containing an input shaft, output shaft and at least one counter shaft, said shafts being rotatably mounted in said housing and each of said shafts carrying at least one gear thereon said gears being in constant mesh, clutching means for selectively clutching one of said gears to a respective one of said shafts to selectively provide driving communication between said input and output shaft, wherein the improvement comprises; a vane fixably mounted to one of said shafts such that said vane impacts and propells said hydraulic fluid when said hydraulic fluid exceeds a preselected level within said transfer case; a spout fixably mounted in said transfer case and located to receive said hydraulic fluid propelled by said vane; means for receiving hydraulic fluid from said spout remote to said transfer case.

2. An improved transfer case having a housing fixably mounted to the housing of a torque transmission member and, said torque transmission member having a transmission member output shaft extending into said transfer case housing, a first gear being splined to said transmission member shaft in constant mesh with a fixed input gear mounted to a transfer case input shaft, said input shaft having a second gear rotatably mounted thereon and clutching means for selectively coupling said second gear to said input shaft, a counter shaft fixably mounted in said transfer case rotatably carrying a third gear in constant mesh with said second gear, a transfer case output shaft rotatably mounted in said transfer case housing and carrying a fixed third gear in constant mesh with said second gear, wherein said improvement comprises; a vane fixably mounted to said input shaft and having a radial extension sufficient to impact and propell said hydraulic fluid should said fluid exceed a preselected level; a spout fixably mounted in said transfer case and located to receive said propelled fluid, a portion of said spout extending into said torque transmission member housing whereby said propelled fluid received by said spout is delivered to said torque transmission member housing.

3. An improved transfer case as claimed in claim 2 wherein the improvement further comprises a wiper fixably mounted in said transfer case in close radial proximity to sid radial projection of said vanes and said spout such that said hydraulic fluid propelled by said vane is more completely directed to said spout.

4. An improved transfer case having a housing containing hydraulic fluid for mounting to a torque transmission member which has a transmission member output shaft extending into said transfer case, a first gear being splined to said transmission member output shaft in constant mesh with a fixed input gear mounted to a transfer case input shaft rotatably mounted in said transfer case housing, said input shaft having a second gear rotatably mounted thereon and clutching means for selectively coupling said second gear to said input shaft, a counter shaft fixably mounted in said transfer case housing rotatably carrying a third gear in constant mesh with said second gear, a transfer case output shaft rotatably mounted in said transfer case housing and carrying a fixed gear in constant mesh with said second gear, wherein said improvement comprises; said clutching means includes a drum fixably mounted to said input shaft and having a plurality of spaced apart axially extending first fingers; a piston slidably received in said drum; a vane slidably mounted in said drum locating said piston between said drum and said vane, said vane including a plurality of spaced apart axially extended second fingers matingly received between said first fingers and having a radially extension greater than said first fingers; a clutch plate fixably and matingly received by said first fingers; said second gear including a base portion extending into said drum; a plurality of first friction plates splined axially to said base portion of said second gear, a plurality of second friction plates splined axially to said fingers of said drum, a pressure plate slidably mounted to said fingers of said drum locating said friction plates between said clutch plate and said pressure plate, said pressure plate having a portion axially aligned to said fingers of said vane; a plurality of bevel springs biased against said pressure plate between said fingers of sand drum; a snap ring received in said fingers of said drum restraining axial motion of said spring; a spout fixably mounted in said transfer case housing and located to receive fluid propelled by said second fingers, a portion of said spout extending into said torque transmission member whereby propelled fluid received by said spout is conducted within said torque transmission member.

5. An improved transfer case as claimed in claim 2 wherein the improvement further comprises a wiper fixably mounted in said transfer case housing in close proximity to said second finger's radial projection and said spout such that said hydraulic fluid propelled by said means is more completely directed to said spout.

* * * * *